(12) United States Patent
Abidi (10) Patent No.: US 11,329,719 B2
(45) Date of Patent: May 10, 2022

(54) PROACTIVE ISOLATION OF LAYER 1 FAULTS BASED ON LAYER 2 ALARM INDICATORS

(71) Applicant: AT&T Intellectual Property I, L.P., Atlanta, GA (US)

(72) Inventor: Mohammad Abidi, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/931,896

(22) Filed: Jul. 17, 2020

(65) Prior Publication Data

US 2022/0021447 A1 Jan. 20, 2022

(51) Int. Cl.
| | | |
|---|---|---|
| G02F 1/00 | (2006.01) | |
| H04B 10/03 | (2013.01) | |
| H04L 41/0631 | (2022.01) | |
| H04B 10/50 | (2013.01) | |
| H04J 14/02 | (2006.01) | |

(52) U.S. Cl.
CPC ........... *H04B 10/03* (2013.01); *H04B 10/503* (2013.01); *H04J 14/021* (2013.01); *H04L 41/0631* (2013.01)

(58) Field of Classification Search
CPC ..... H04B 10/03; H04B 10/503; H04J 14/021; H04L 41/0631
USPC .............................................. 398/7
See application file for complete search history.

(56) References Cited

U.S. PATENT DOCUMENTS

| | | | |
|---|---|---|---|
| 7,933,209 B2 * | 4/2011 | Abidi | H04J 3/14 370/241 |
| 2010/0036939 A1 * | 2/2010 | Yang | H04L 41/0677 709/224 |

* cited by examiner

*Primary Examiner* — Mohammad R Sedighian
(74) *Attorney, Agent, or Firm* — Guntin & Gust, PLC; Jay Anderson (57) ABSTRACT

Methods, systems, and apparatuses, among other things, may integrate one or more first alarms reported by routers and Ethernet switches with one or more second alarms reported by reconfigurable optical add/drop multiplexers (ROADMs) and optical transport network (OTN) network elements. Moreover, one or more troubleshooting actions may be performed based on the integrated first alarms and second alarms.

20 Claims, 7 Drawing Sheets

PROACTIVE ISOLATION OF LAYER 1 FAULTS BASED ON LAYER 2 ALARM INDICATORS

TECHNICAL FIELD

This disclosure relates generally to automatic fault and performance monitoring, and more particularly, to a system and method for implementing logic to integrate alarms reported by routers and Ethernet switches with those reported by reconfigurable optical add-drop multiplexer (ROADM) and optical transport network (OTN) network elements (ONEs) and use alarms and performance management (PM) data to precisely isolate root cause of failures.

BACKGROUND

Long-distance telecommunication networks have evolved from, first, time-division multiplexing (TDM) switched networks into, second, networks with Layers 2 and 3 routers and Ethernet switches over a transport network of ROADM/OTN transport network backbone. Historically, Layer 2 Ethernet switches and Layer 3 routers respectively report alarms that only provide an indication of failure at Layer 2/Layer 3 without providing any details regarding an underlying root cause of failure. Therefore, in order to isolate root causes of trouble more precisely (e.g., reducing operational expenditure costs for the network maintenance and service providers), it has become critical to integrate failures reported via more granular and more detailed alarms by Layer 2 Ethernet switches and Layer 3 routers with alarms reported by ROADM/OTN transport network elements.

SUMMARY

The present disclosure discloses a method for integrating one or more first alarms reported by routers and Ethernet switches with one or more second alarms reported by reconfigurable optical add/drop multiplexers (ROADMs) or optical transport network (OTN) network elements.

For example, first alarm data (e.g., including signal failures, remote faults, local faults, etc.) may be acquired from a broadcast media access control (MAC) level network (e.g., Layer 2 network) at a first location and a segmented routing over internet protocol (IP) network (e.g., Layer 3 network) at the first location. For example, first alarm data may include alarms such as SignalFail-Set, SignalFail-Clear, LocalFault-Set, LocalFault-Clear, RemoteFault-Set, or RemoteFault-Clear. Moreover, second alarm data (e.g., including upstream or downstream hard alarms) may be acquired from a first OTN network element (NE) in an OTN (e.g., Layer 1 network). Based on the first alarm data (e.g., remote, local, signal failure, etc.) and the second alarm data (e.g., a direction of a hard alarm), one or more troubleshooting actions may be performed.

In some examples, a laser optical parameter at the first OTN network element in the Layer 1 (L1) network may be analyzed based on the first alarm data including a signal failure. Moreover, it may be determined that the laser optical parameter fails to satisfy a performance criterion and, based on the determination, the one or more troubleshooting actions may include issuing a dispatch to replace a laser transmitter associated with the laser optical parameter.

For example, laser optical parameters (e.g., an optical power parameter) may include optical network element information for optical network elements and analysis of laser optical parameters may include comparisons of the laser optical parameters with vendor information. For example, vendor information may include a high-water mark and a low water mark defining a specified power level range for an optical network element. Moreover, multiple specified power level ranges may be provided by a vendor, for example, a client-side range and a network side range. Likewise, a specified power level may define multiple high and low marks. For example, an optical power received (OPR) high and low mark and an optical power transmitted (OPT) high and low mark may be provided, e.g., where the OPR range is broader than the OPT range. Thus, analysis of optical parameters may include determination of whether the OPT or OPR associated with an optical network element falls within vendor-specified OPR or OPT ranges. Along the same lines, analysis of optical parameters may consider a number of different signals associated with an optical network element, including average, mean, maximum, minimum, high, low, etc.

In another example, a laser optical parameter at the first OTN network element in the L1 network may be analyzed based on the first alarm data including a signal failure. Moreover, it may be determined that the laser optical parameter satisfies a performance criteria and the first OTN network element in the L1 network may be analyzed based on the satisfaction of the performance criteria, Furthermore, it may be determined the second alarm data does not include an L1 network alarm and the first alarm data may be analyzed based on the determination that the second alarm data does not include the L1 network alarm. Additionally, the one or more troubleshooting actions may include issuing a dispatch to clean an optical line associated with the signal failure if it is determined that the first alarm data does not include a Layer 2 network alarm or a Layer 3 network alarm.

In some examples, the disclosure sets forth an improvement in computer technology by implementing new and more precise alarms (e.g., as opposed to conventional alarms) from Layer 2/Layer 3 NEs in conjunction with Layer 1 ROADM/OTN NE alarms. In some examples, transient problems may be identified, such as problems caused by dirty fiber or laser power below threshold watermarks. In some other examples, hard problems may be identified, such as problems due to fiber cut or a hard down of the card on a NE. Moreover, these automated methodologies may greatly reduce or eliminate inspection times required to isolate root cause of trouble, thus reducing operational expenditure costs for network maintenance and service providers, while contributing towards an improved network and customer experience.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

The disclosed subject matter may integrate alarms (e.g., trap messages) reported by routers and Ethernet switches with alarms (e.g., trap messages) reported by reconfigurable optical add/drop multiplexers (ROADMs) and optical transport network (OTN) network elements and use alarms and performance management (PM) data to precisely isolate root cause of failures.

Typical Layer 2 (L2) Ethernet switches and Layer 3 (L3) routers respectively report an L2/L3 alarm "LinkDown" when they fail to synch up with a Layer 1 (L1) transport network element (NE) (e.g., ROADM and OTN network elements) and "LinkUp" when they synch up with an L1 NE. Problematically, the LinkDown alarms provide an indication of failure at L2 or L3 without providing any details regarding an underlying root cause of failure.

In some examples, the disclosed L2 or L3 network elements (NEs) (e.g., ethernet switches or routers) have been enhanced to also provide more granular alarms, e.g., SignalFail-Set and SignalFail-Clear, LocalFault-Set and LocalFault-Clear, and RemoteFault-Set and RemoteFault-Clear. The enhanced alarms provide additional details with respect to an underlying failure associated with an alarm. Moreover, the systems and methods of the automated system comprise a practical application that advances the state of telecommunications technology.

For example, in the case of the alarm LinkDown, an alarm SignalFail-Set may be generated when the L2/L3 detects that an error threshold has been crossed. For example, the detection may be performed by an application configured to integrate alarms and retrieve PM data, including performing surveillance of alarms being published by the network elements via a management system (e.g., an SDN Controller, EMS, or any other surveillance system). Moreover, an alarm SignalFail-Clear may be generated when errors are reduced below an error threshold. LocalFault-Set may be generated for a loss of received signal, the port may transmit a fault code, and the remote end will then issue a RemoteFault-Set.

Accordingly, the L2/L3 alarms may be used in conjunction with alarms reported by L1 transport ROADM/OTN NEs. Furthermore, hard to isolate transient failures may be identified and isolated using SignalFail-Set and SignalFail-Clear and the direction of hard failures may be identified using LocalFault-Set and RemoteFault-Set. In some examples, SignalFail-Set may be generated when the Layer 2/Layer 3 detects that an error threshold has been crossed. SignalFail-Clear may be generated when errors are reduced below an error threshold. LocalFault-Set may be generated for a loss of received signal. The port may transmit a fault code and the remote end may then issue a RemoteFault-Set.

Thus, examples provide technological advancements to isolating root causes of trouble and may reduce operating expenditure costs for the network maintenance and service providers.

In some examples, the L1 network may include a set of ONEs connected by optical fiber links and may provide functionality of transport, multiplexing, switching, management, supervision and survivability of optical channels carrying client signals. The L2 network may control hardware responsible for interaction with wired, optical or wireless transmission medium. The L3 network may use segmented routing to forward data packets based on service routes.

Figure 1:
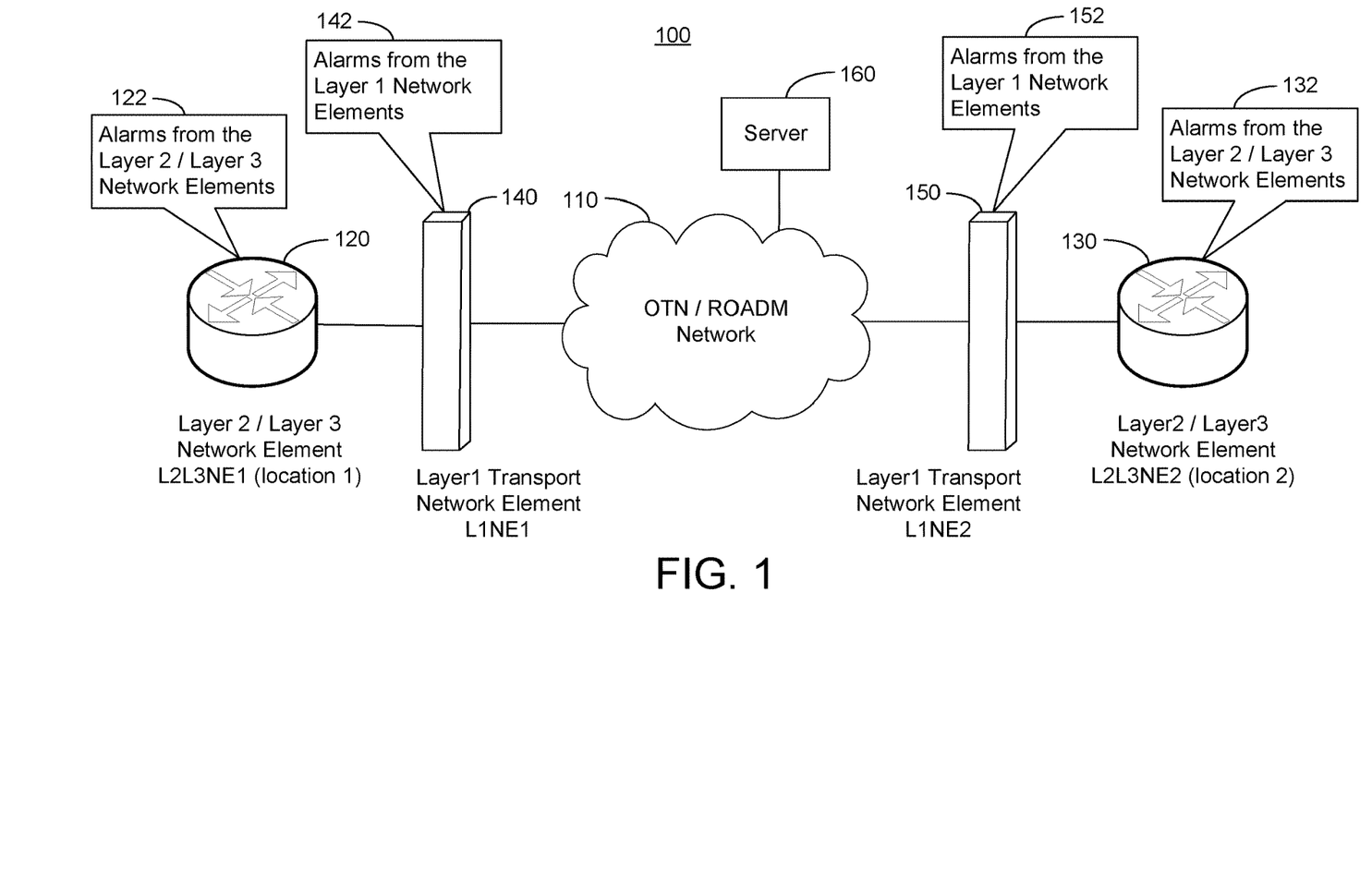
FIG. 1 is an exemplary representation of a backbone network with Layer 3 routers and Ethernet switches over a transport network of ROADM/OTN transport network backbone.

FIG. 1 illustrates an exemplary network architecture 100 for integrating alarms reported by routers and Ethernet switches with alarms reported by ROADMs and OTN NEs, among other things. Exemplary network architecture 100 may include OTN/ROADM network 110. In an example, network architecture 100 includes one L2/L3 NE at each end of Layer 1 ROADM/OTN Network transporting L2/L3 traffic over transport network. Moreover, each L2/L3 NE may report one or more alarms. For example, L2L3NE1 120 at location 1 may report one or more alarms 122 and L2L3NE2 130 at location 2 may report one or more alarms 132. Moreover, network architecture 100 may further include one or more L1 transport network elements which may report one or more alarms. For example, L1NE1 140 may report one or more alarms 142 and L1NE2 150 may report one or more alarms 152. One or more of the alarms (e.g., alarms 122, 132, 142, or 152) may be received by server 160, e.g., via the OTN/ROADM network. For example, typical alarm data may include alarms 122, 132, 142 and 152, as well as alarms from OTN/ROADM Network which may be surveilled and gathered in an application.

For example, alarm data (e.g., alarms 122, 132, 142, or 152) may include signal failures, remote faults, local faults, and may be acquired from a broadcast MAC level network (e.g., L2 network) at location 1 and a segmented routing over IP network (e.g., L3 network) at location 1. Moreover, second alarm data (e.g., including upstream or downstream hard alarms) may be acquired from a first OTN network element (NE) in an OTN (e.g., Layer 1 network). Based on the first alarm data (e.g., remote, local, signal failure, etc.) and the second alarm data (e.g., a direction of a hard alarm), one or more troubleshooting actions may be performed.

Figure 2:
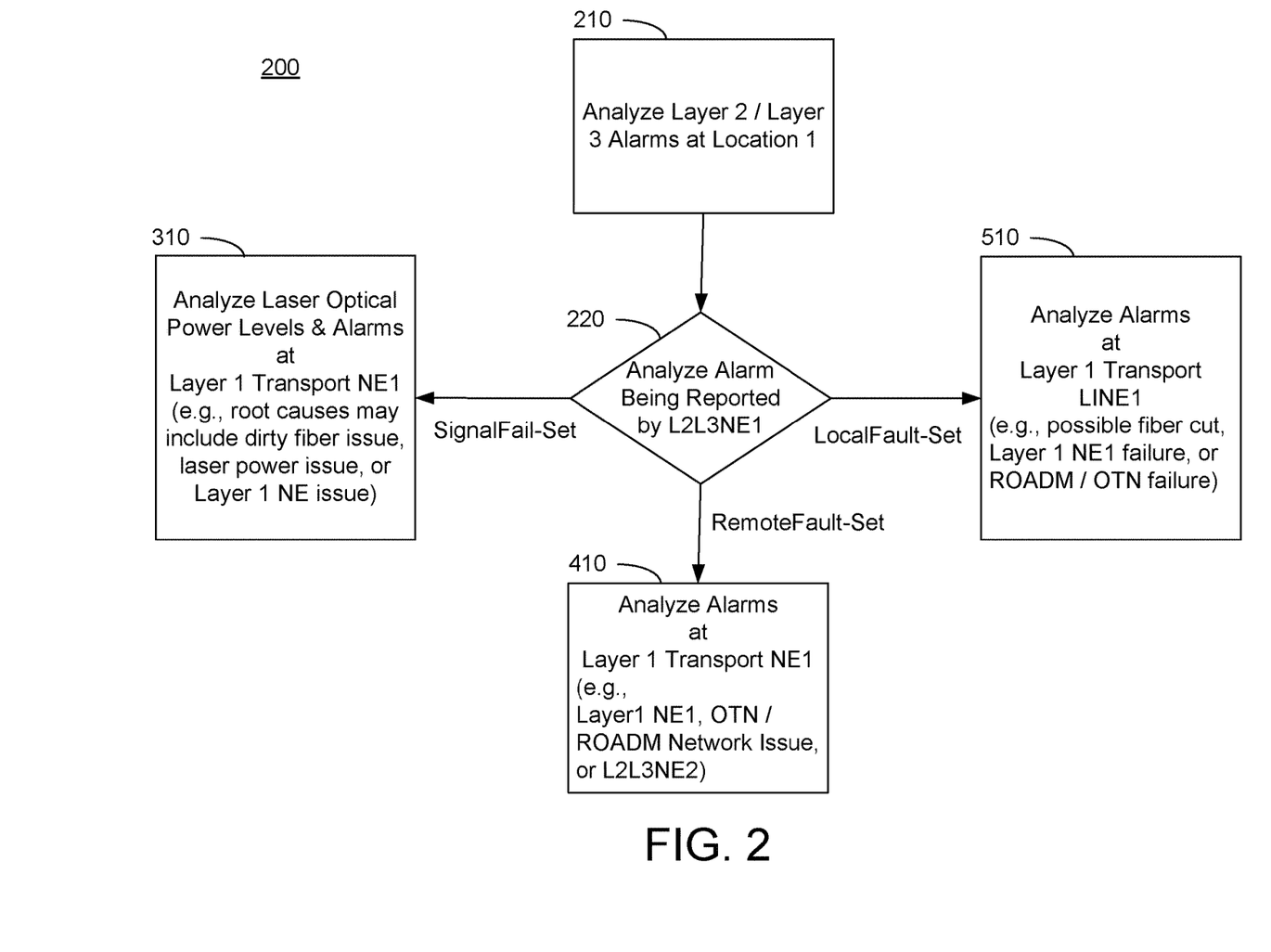
FIG. 2 is an exemplary flowchart of a method to monitor for alarms reported by Layer 2 Ethernet switches and Layer 3 routers and alarms reported by ROADM/OTN transport network elements in accordance with the present disclosure.

FIG. 2 illustrates an exemplary flowchart of a method 200 to monitor for or be triggered by alarms reported by L2 Ethernet switches and L3 routers on location 1 (e.g., alarms 122 and alarms 132 respectively reported by L2L3NE1 120 and L2L3NE2 130) and alarms reported by ROADM & OTN transport network elements (e.g., alarms 142 and alarms 152 respectively reported by L1NE1 140 and L1NE2 150). In some examples, the method 200 is performed by a device or machine (e.g., server 160 or network device 600). As understood by one of ordinary skill in the art, the presence of alarms of location 2 may also be used as needed for the logic triggered by alarms in location 1.

Moreover, the method 200 may be performed at a network device, UE, desktop, laptop, mobile device, server device, or by multiple devices in communication with one another. In some examples, the method 200 is performed by processing logic, including hardware, firmware, software, or a combination thereof. In some examples, the method 200 is performed by a processor executing code stored in a computer-readable medium (e.g., a memory).

At block 210, the method 200 checks L2/L3 Alarms at Location 1. For example, method 200 may check alarms 122 reported by L2L3NE1 120.

At block 220, the method 200 checks alarms being reported by an L2/L3 NE at a first location (e.g., L2L3NE1 120). If the alarms reported by L2L3NE1 include a signal failure (e.g., SignalFail-Set), method 200 proceeds to block 310 (e.g., see FIG. 3). If the alarms reported by L2L3NE1 include a remote fault (e.g., RemoteFault-Set), method 200 proceeds to block 410 (e.g., see FIG. 4). If the alarms reported by L2L3NE1 include a local fault (e.g., LocalFault-Set), method 200 proceeds to block 510 (e.g., see FIG. 5).

Figure 3:
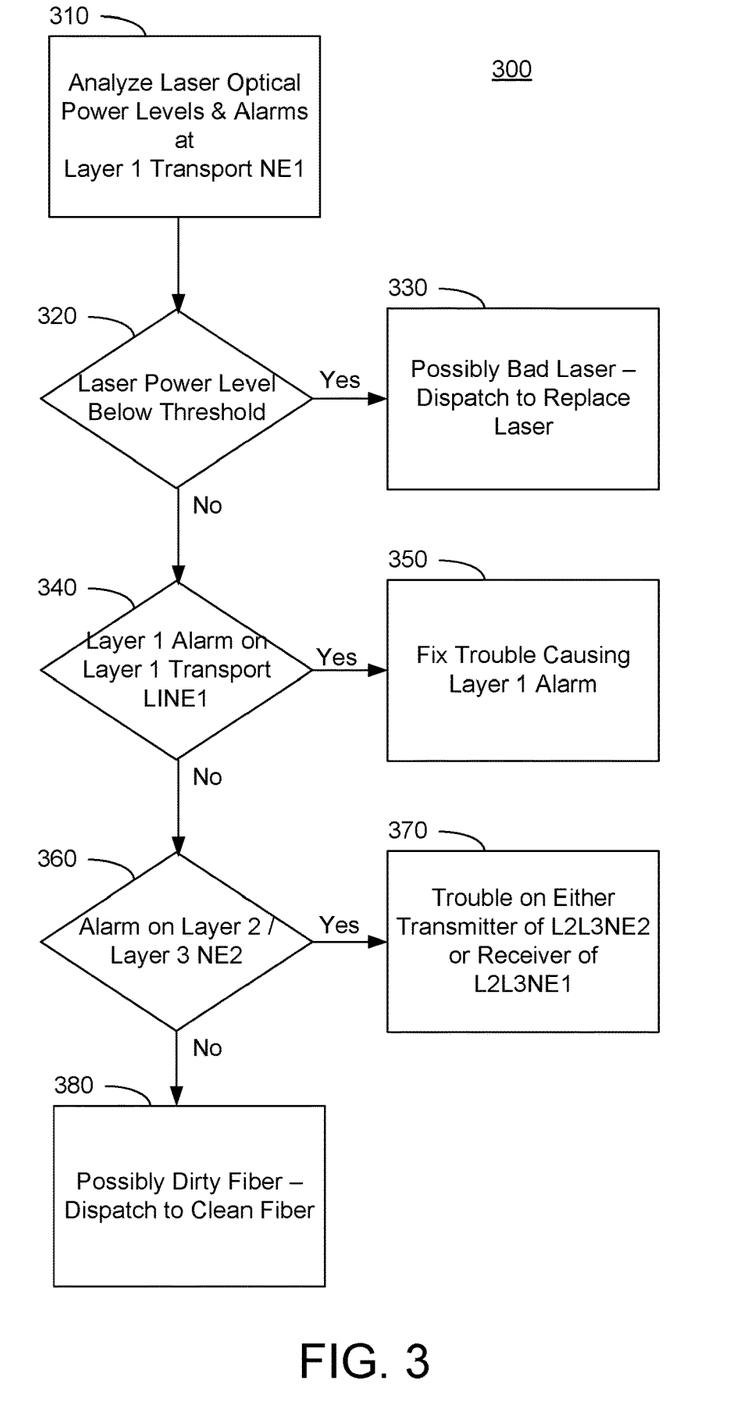
FIG. 3 is an exemplary flowchart of a fault isolation process to isolate faults and identify the root causes of hard alarms and failures on a backbone network with Layer 3 routers and Ethernet switches over a transport network of ROADM/OTN transport network backbone in accordance with the present disclosure.

FIG. 3 illustrates an exemplary flowchart of a method 300 to isolate faults and identify the root causes of hard alarms (e.g., resulting from persistent failures) on a backbone network with L3 routers and Ethernet switches over a transport network of ROADM/OTN transport network backbone in accordance with the present disclosure. For example, root causes may include a dirty fiber, a laser transmitter or laser receiver issue in Layer 1, a Layer 2/Layer 3 NE, or a Layer 1 NE failure. In some examples, the hard alarms may be exhibited as a SignalFail-Set alarm from a Layer 2/Layer 3 switch, laser optical power levels of a Layer 1 NE facing Layer 2/Layer 3 NEs, or alarms from Layer 1 NEs part of ROADM/OTN backbone transport network. The present disclosure includes additional exemplary flowcharts (e.g., flowcharts 200, 300, 400 and 500) that may be triggered by alarms reported by Layer 2/Layer 3 and Layer 1 NEs in location 2. As understood by one of ordinary skill in the art, the presence of alarms of location 2 may also be used as needed for the logic triggered by alarms in location 1.

In some examples, the method 300 is performed by a device or machine (e.g., server 160 or network device 600). Moreover, the method 300 may be performed at a network device, UE, desktop, laptop, mobile device, server device, or by multiple devices in communication with one another. In some examples, the method 300 is performed by processing logic, including hardware, firmware, software, or a combination thereof. In some examples, the method 300 is performed by a processor executing code stored in a computer-readable medium (e.g., a memory).

At block 310, the method 300 analyzes laser optical parameters (e.g., an optical power parameter), for example, laser power levels and alarms at an L1 transport NE1. In some examples, the method 300 may compare received laser optical values against standard laser optical values. For example, a manufacturer of an NE may provide optical power static water marks (e.g., maximum or minimum Tx LWT, Tx HWT, Rx LWT, or Rx HWT dBm) for each card or interface associated with the network element. Moreover, analysis of the laser optical parameters may lead to root cause determination (e.g., dirty fiber or possible laser/transmitter/receiver issues) in Layer 1 NE, Layer 2/3 NE or possible Layer 1 Transport NE as exhibited by a SignalFail-Set alarm from Layer 2/Layer 3 switch, laser optical power levels of Layer 1 NE facing Layer 2/Layer 3 NEs, or alarms from Layer 1 NEs part of ROADM/OTN backbone transport by network.

At block 320, the method 300 determines whether the laser power level (e.g., of a laser associated with an optical line or fiber) is below a threshold. If the laser power level is below the threshold, it is determined at block 330 that the laser may be failing. Accordingly, a troubleshooting action may include replacing the laser or issuing a dispatch to replace the laser. If the laser power level is not below the threshold, the method 300 may proceed to block 340.

At block 340, the method 300 may determine whether an L1 alarm is present on the L1NE1 140 transport at the first location. For example, the method 300 may check alarms 142 at L1NE1 140 transport at the first location. If there is an alarm present on L1NE1 140 transport at the first location, a troubleshooting action at block 350 may include fixing the trouble causing the L1 Alarm. If there are no alarms present on L1NE1 140 transport at the first location, the method 300 may proceed to block 360.

At block 360, the method 300 may determine whether an alarm is present on the L2L3NE2 130 NE at the second location. For example, the method 300 may check alarms 132 at L2L3NE2 130. If there is an alarm present on L2L3NE2 130 NE at the second location, it may be determined at block 370 that there is an issue with a transmitter of L2L3NE2 130 NE at the second location or a receiver of L2L3NE1 120 NE at the first location. If there are no alarms present on L2L3NE2 130 NE at the second location, the method 300 may proceed to block 380.

At block 370, the method 300 may determine that the optical fiber is dirty and a troubleshooting action may include cleaning the optical fiber or issuing a dispatch to clean the optical fiber.

Figure 4:
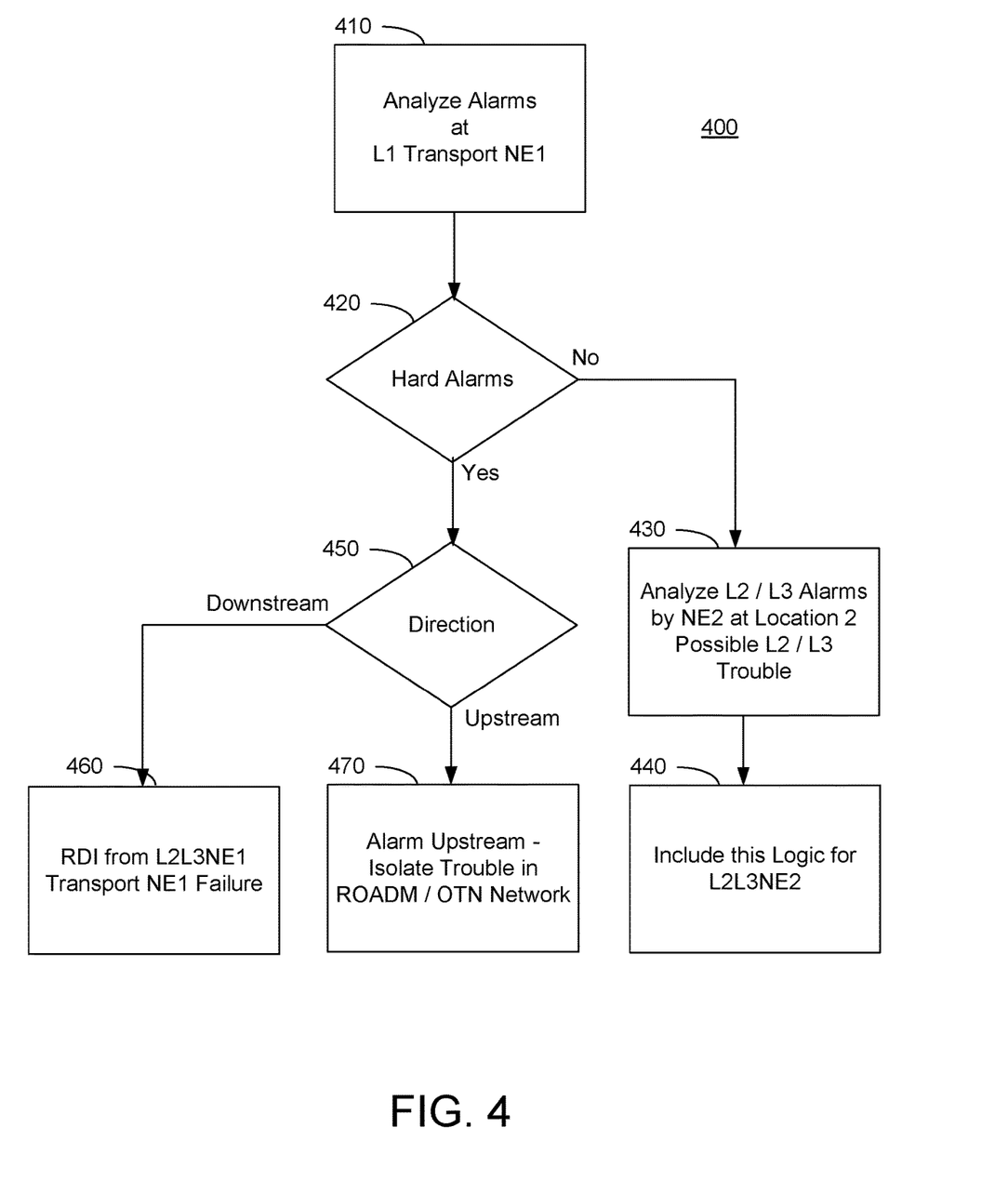
FIG. 4 is an exemplary flowchart of a fault isolation process to isolate faults and identify the root causes of hard alarms and failures on a backbone network with Layer 3 routers and Ethernet switches over a transport network of ROADM/OTN transport network backbone in accordance with the present disclosure.

FIG. 4 illustrates an exemplary flowchart of a method 400 to identify the root causes of hard alarms or failures on a backbone network with L3 routers and Ethernet switches over a transport network of ROADM/OTN transport network backbone in accordance with the present disclosure. For example, the root causes of failure of a Layer 1 transport NE, failure of ROADM/OTN Layer 1 backbone network or failure of Layer 2/Layer 3 switch on other end of circuit, as exhibited by a RemoteFault-Set alarm from Layer 2/Layer 3 switch, RDI alarm Layer 2/Layer 3 NEs and alarms from Layer 1 NEs part of ROADM/OTN backbone transport network, may be identified and troubleshooted in accordance with the present disclosure.

In some examples, the method 400 is performed by a device or machine (e.g., server 160 or network device 600). Moreover, the method 400 may be performed at a network device, UE, desktop, laptop, mobile device, server device, or by multiple devices in communication with one another. In some examples, the method 400 is performed by processing logic, including hardware, firmware, software, or a combination thereof. In some examples, the method 400 is performed by a processor executing code stored in a computer-readable medium (e.g., a memory). The present disclosure includes additional exemplary flowcharts (e.g., flowcharts 200, 300, 400 and 500) that may be triggered by alarms reported by Layer 2/Layer 3 and Layer 1 NEs in location 2. As understood by one of ordinary skill in the art, the presence of alarms of location 2 may also be used as needed for the logic triggered by alarms in location 1.

At block 410, the method 400 may analyze alarms at L1NE1 140 transport at the first location. Moreover, the method 400 may lead to root cause determination of a failure of a Layer 1 transport NE, a failure of OTN/ROADM Layer 1 backbone network or a failure of L2/L3 switch on other end of circuit, as exhibited RemoteFault-Set alarm from Layer 2/Layer 3 switch, RDI alarm Layer 2/Layer 3 NEs and alarms from Layer 1 NEs part of ROADM/OTN backbone transport network.

At block 420, the method 400 determines whether the alarms at L1NE1 140 transport at the first location include any hard alarms. If the alarms at L1NE1 140 transport at the first location do not include any hard alarms, the method 400 may proceed to block 430.

At block 430, the method 400 may analyze the alarms being reported by L2L3NE2 130 NE at the second location. For example, the method 400 may analyze alarms 132 reported by L2L3NE2 130 NE at the second location to identify the issue associated with the alarms. A troubleshooting action at block 440 may involve including this troubleshooting logic for L2L3NE2 130 NE at the second location.

If, at block 420, the method 400 determines the alarms at L1NE1 140 transport at the first location do include hard alarms, the method 400 may proceed to block 450. At block 450, the method 400 may determine the direction (e.g., upstream or downstream) of the hard alarm.

If the method 400 determines the direction of the hard alarm is downstream, the method 400 may proceed to block 460. At block 460, the method 400 may identify that there is a remote defect indicator (RDI) from L2L3NE1 120 NE at the first location or a failure of L1NE1 140 transport at the first location.

If the method 400 determines the direction of the hard alarm is upstream, the method 400 may proceed to block 470. At block 470, the method 400 may isolate trouble in the ROADM/OTN network.

Figure 5:
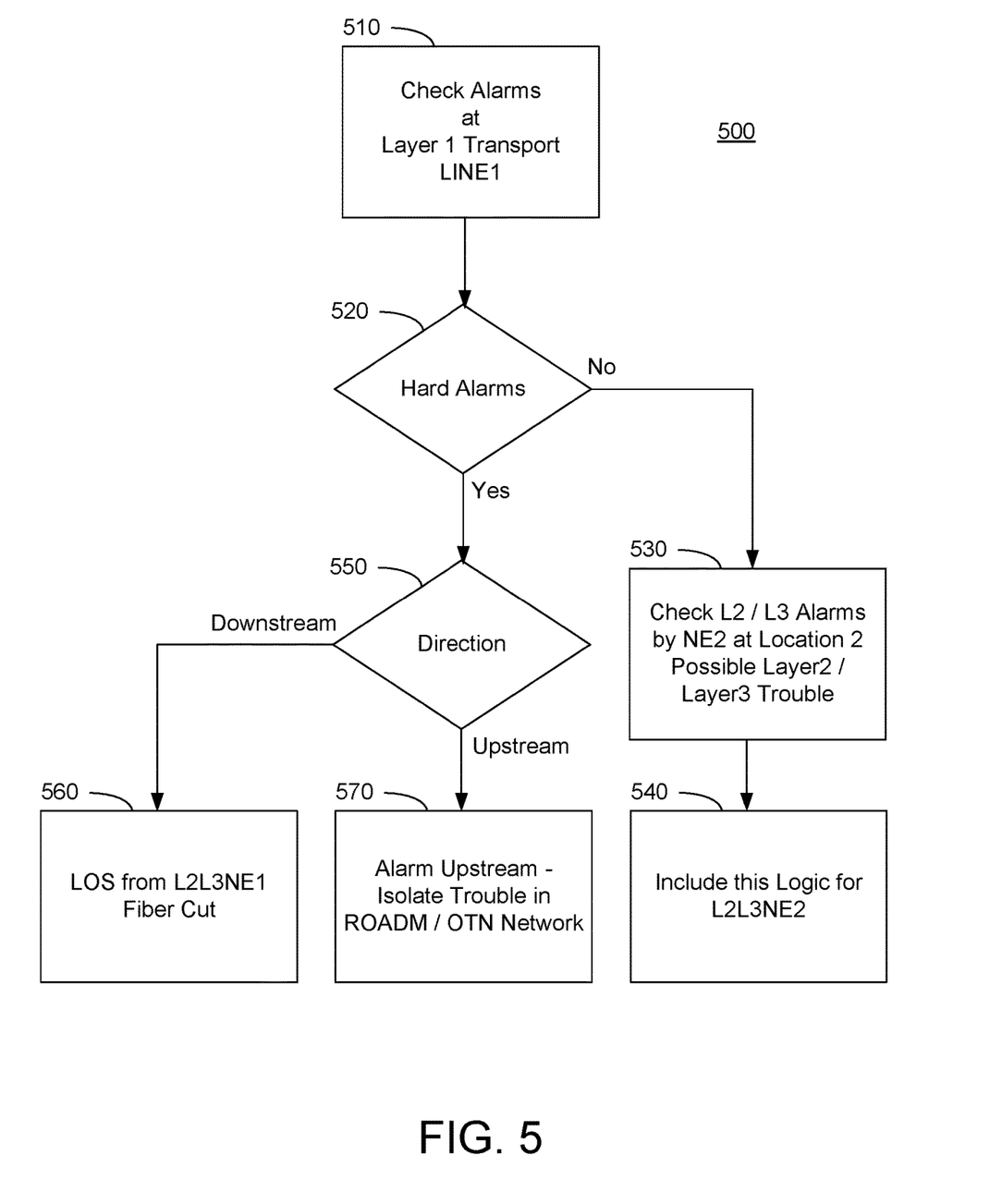
FIG. 5 is an exemplary flowchart of a fault isolation process to isolate faults and identify the root causes of hard alarms and failures on a backbone network with Layer 3 routers and Ethernet switches over a transport network of ROADM/OTN transport network backbone in accordance with the present disclosure.

FIG. 5 illustrates an exemplary flowchart of a method 500 to identify the root causes of hard alarms and failures on a backbone network with L3 routers and Ethernet switches over a transport network of ROADM/OTN transport network backbone in accordance with the present disclosure. In some examples, the method 500 may identify the root causes of either fiber cut or Layer 1 transport ROADM/OTN Network failure, as exhibited by a LocalFault-Set alarm from Layer 2/Layer 3 switch, failure of Layer 1 NE ROADM/OTN backbone transport network facing Layer 2/Layer 3 NEs and alarms from Layer 1 NEs part of ROADM/OTN backbone transport network, or failure of L2/L3 switch on other end of circuit.

In some examples, the method 500 is performed by a device or machine (e.g., server 160 or network device 600). Moreover, the method 500 may be performed at a network device, UE, desktop, laptop, mobile device, server device, or by multiple devices in communication with one another. In some examples, the method 500 is performed by processing logic, including hardware, firmware, software, or a combination thereof. In some examples, the method 500 is performed by a processor executing code stored in a computer-readable medium (e.g., a memory). The present disclosure includes additional exemplary flowcharts (e.g., flowcharts 200, 300, 400 and 500) that may be triggered by alarms reported by Layer 2/Layer 3 and Layer 1 NEs in location 2. As understood by one of ordinary skill in the art, the presence of alarms of location 2 may also be used as needed for the logic triggered by alarms in location 1.

At block 510, the method 500 analyzes alarms at L1NE1 140 transport at the first location. For example, the method 500 may lead to root cause determination of failures (e.g., fiber cut or Layer 1 transport ROADM/OTN Network failures) as exhibited by alarms such as LocalFault-Set alarm from Layer 2/Layer 3 switch, failure of Layer 1 NE ROADM/OTN backbone transport network facing Layer 2/Layer 3 NEs, and alarms from Layer 1 NEs part of ROADM/OTN backbone transport network or failure of L2/L3 switch on other end of circuit.

At block 520, the method 500 determines whether the alarms at L1NE1 140 transport at the first location include any hard alarms. If the alarms at L1NE1 140 transport at the first location do not include any hard alarms, the method 500 may proceed to block 530.

At block 530, the method 500 may analyze the alarms being reported by the L2L3NE2 130 NE at the second location. For example, the method 500 may analyze alarms 132 reported by L2L3NE2 130 NE at the second location to identify the issue associated with the alarms. A troubleshooting action at block 540 may involve including this troubleshooting logic for L2L3NE2 130 NE at the second location.

If, at block 520, the method 500 determines the alarms at the L1NE1 140 transport at the first location includes hard alarms, the method 500 may proceed to block 550. At block 550, the method 500 may determine the direction (e.g., upstream or downstream) of the hard alarm.

If the method 500 determines the direction of the hard alarm is downstream, the method 500 may proceed to block 560. At block 560, the method 500 may identify that there is a loss of signal (LOS) from L2L3NE1 120 NE at the first location.

If the method 500 determines the direction of the hard alarm is upstream, the method 500 may proceed to block 570. At block 570, the method 500 may isolate trouble in the ROADM/OTN network.

Figure 6:
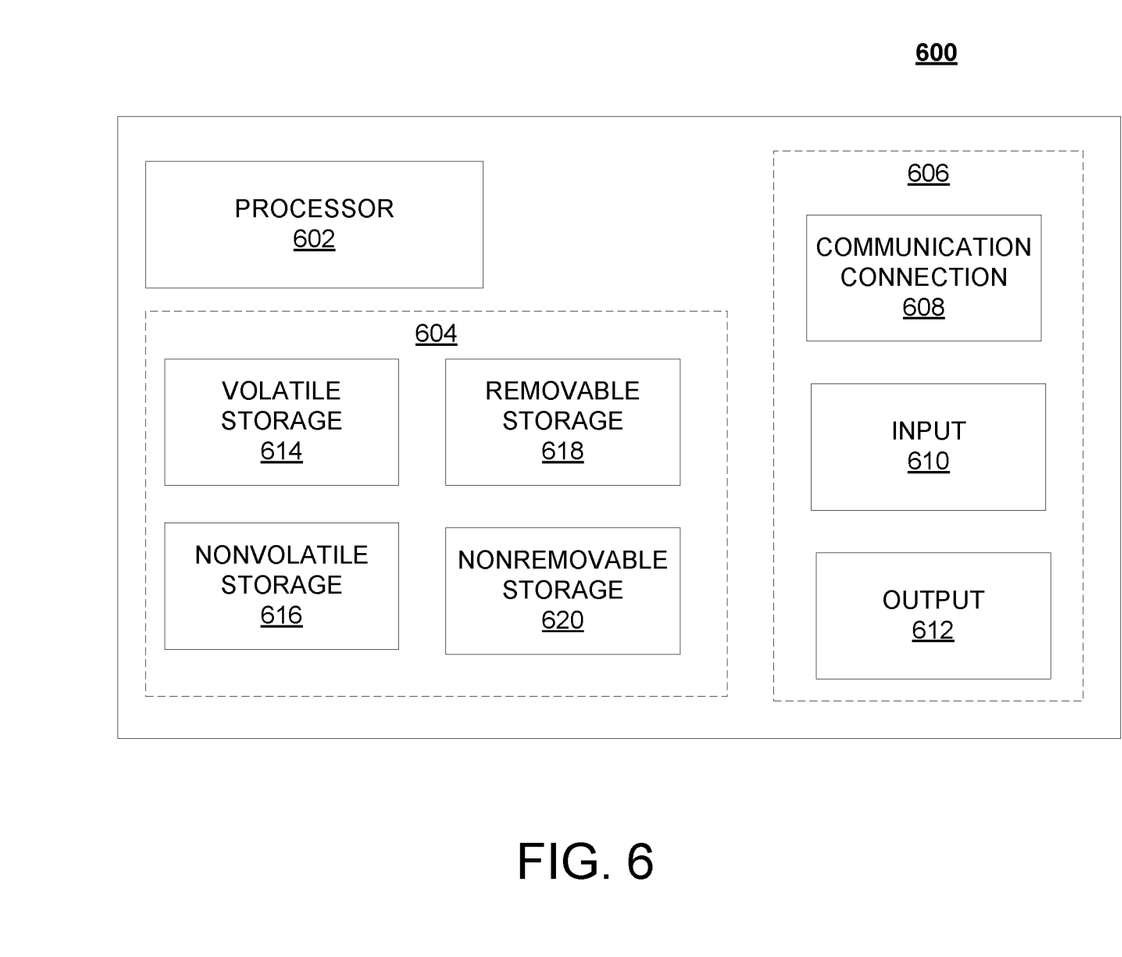
FIG. 6 illustrates a schematic of an exemplary network device.

FIG. 6 is a block diagram of network device 600 that may be connected to or comprise a component of communication system 100. network device 600 may comprise hardware or a combination of hardware and software. The functionality to facilitate telecommunications via a telecommunications network may reside in one or a combination of network devices 600. network device 600 depicted in FIG. 6 may represent or perform functionality of an appropriate network device 600, or a combination of network devices 600, such as, for example, a component or various components of a cellular broadcast system wireless network, a processor, a server, a gateway, an LTE or 5G anchor node or eNB, a mobile switching center (MSC), a short message service center (SMSC), an automatic location function server (ALFS), a gateway mobile location center (GMLC), a serving gateway (S-GW) 430, a packet data network (PDN) gateway, an RAN, a serving mobile location center (SMLC), or the like, or any appropriate combination thereof. It is emphasized that the block diagram depicted in FIG. 6 is exemplary and not intended to imply a limitation to a specific example or configuration. Thus, network device 600 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 600 may comprise a processor 602 and a memory 604 coupled to processor 602. Memory 604 may contain executable instructions that, when executed by processor 602, cause processor 602 to effectuate operations associated with fault and performance monitoring. As evident from the description herein, network device 600 is not to be construed as software per se.

In addition to processor 602 and memory 604, network device 600 may include an input/output system 606. Processor 602, memory 604, and input/output system 606 may be coupled together to allow communications between them. Each portion of network device 600 may comprise circuitry for performing functions associated with each respective portion. Thus, each portion may comprise hardware, or a combination of hardware and software. Accordingly, each portion of network device 600 is not to be construed as software per se. Input/output system 606 may be capable of receiving or providing information from or to a communications device or other network entities configured for telecommunications. For example, input/output system 606 may include a wireless communications (e.g., 3G/4G/5G/GPS) card. Input/output system 606 may be capable of receiving or sending video information, audio information, control information, image information, data, or any combination thereof. Input/output system 606 may be capable of transferring information with network device 600. In various configurations, input/output system 606 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 606 may comprise a Wi-Fi finder, a two-way GPS chipset or equivalent, or the like, or a combination thereof.

Input/output system 606 of network device 600 also may contain a communication connection 608 that allows network device 600 to communicate with other devices, network entities, or the like. Communication connection 608 may include wired media such as a wired network or direct-wired connection, or wireless media such as acoustic, RF, infrared, or other wireless media. Input/output system 606 also may include an input device 610 such as keyboard, mouse, pen, voice input device, or touch input device. Input/output system 606 may also include an output device 612, such as a display, speakers, or a printer.

Processor 602 may be capable of performing functions associated with telecommunications, such as functions for fault and performance monitoring, as described herein. For example, processor 602 may be capable of, in conjunction with any other portion of network device 600, determining a type or root cause of a fault and acting according to the fault type or root cause, as described herein.

Memory 604 of network device 600 may comprise a storage medium having a concrete, tangible, physical structure. As is known, a signal does not have a concrete, tangible, physical structure. Memory 604, as well as any computer-readable storage medium described herein, is not to be construed as a signal. Memory 604, as well as any computer-readable storage medium described herein, is not to be construed as a transient signal. Memory 604, as well as any computer-readable storage medium described herein, is not to be construed as a propagating signal. Memory 604, as well as any computer-readable storage medium described herein, is to be construed as an article of manufacture.

Memory 604 may store any information utilized in conjunction with telecommunications. Depending upon the exact configuration or type of processor, memory 604 may include a volatile storage 614 (such as some types of RAM), a nonvolatile storage 616 (such as ROM, flash memory), or a combination thereof. Memory 604 may include additional storage (e.g., a removable storage 618 or a non-removable storage 620) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 600. Memory 604 may comprise executable instructions that, when executed by processor 602, cause processor 602 to effectuate operations to map signal strengths in an area of interest.

Figure 7:
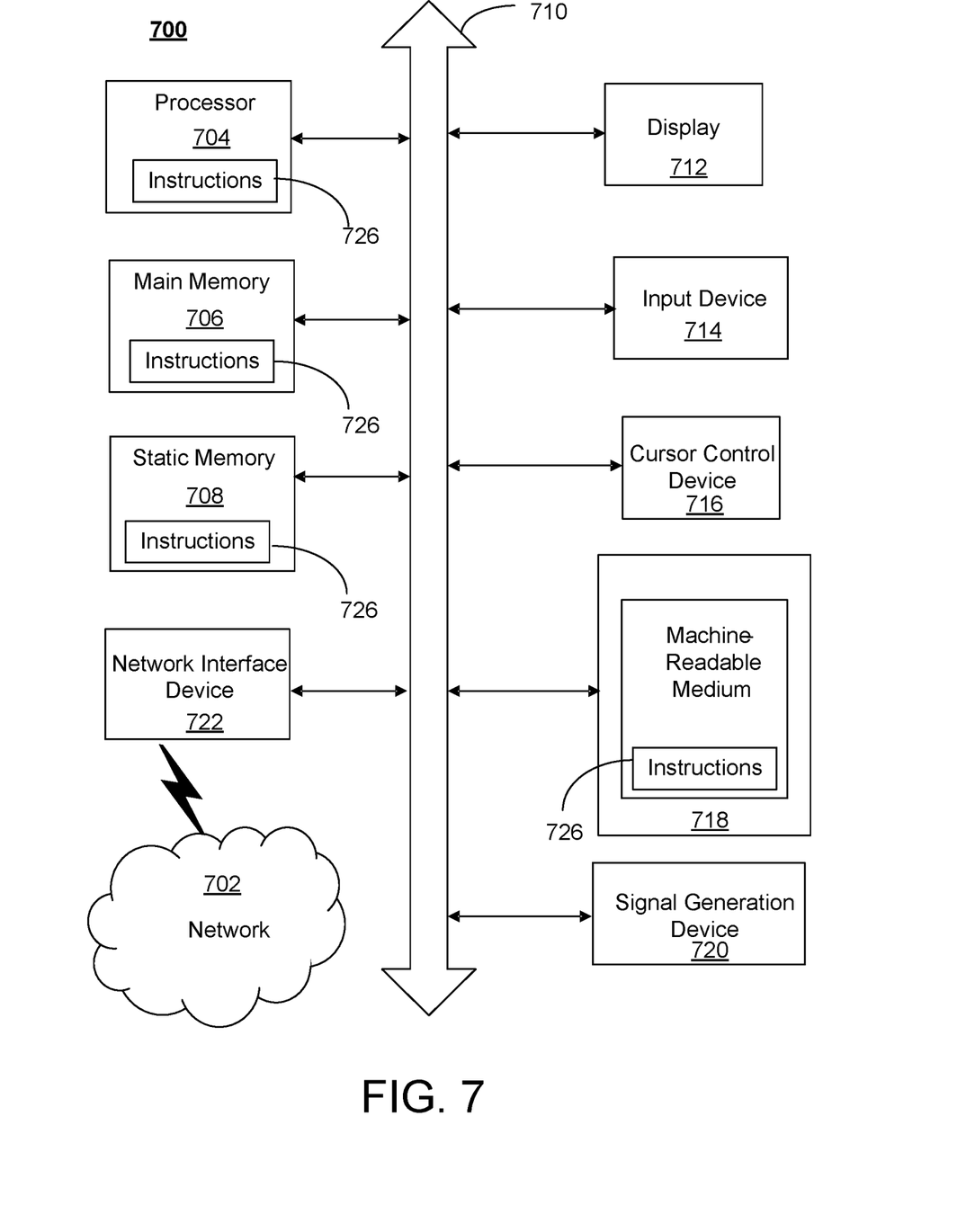
FIG. 7 illustrates an exemplary communication system that provides wireless telecommunication services over wireless communication networks.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as processor 602 and other devices of FIG. 1, FIG. 2, FIG. 3, FIG. 4, FIG. 5, and FIG. 6. In some examples, the machine may be connected (e.g., using a network 702) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 700 may include a processor (or controller) 704 (e.g., a central processing unit (CPU)), a graphics processing unit (GPU, or both), a main memory 706 and a static memory 708, which communicate with each other via a bus 710. The computer system 700 may further include a display unit 712 (e.g., a liquid crystal display (LCD), a flat panel, or a solid-state display). Computer system 700 may include an input device 714 (e.g., a keyboard), a cursor control device 716 (e.g., a mouse), a disk drive unit 718, a signal generation device 720 (e.g., a speaker or remote control) and a network interface device 722. In distributed environments, the examples described in the subject disclosure can be adapted to utilize multiple display units 712 controlled by two or more computer systems 700. In this configuration, presentations described by the subject disclosure may in part be shown in a first of display units 712, while the remaining portion is presented in a second of display units 712.

The disk drive unit 718 may include a tangible computer-readable storage medium on which is stored one or more sets of instructions (e.g., instructions 726) embodying any one or more of the methods or functions described herein, including those methods illustrated above. Instructions 726 may also reside, completely or at least partially, within main memory 706, static memory 708, or within processor 704 during execution thereof by the computer system 700. Main memory 706 and processor 704 also may constitute tangible computer-readable storage media.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which call processing continuity can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—call processing continuity—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods.

What is claimed:
1. A method comprising:
   acquiring, by a processing system including a processor, first alarm data from a Layer 2 network element or a Layer 3 network element at a first location;
   acquiring, by the processing system, second alarm data from a Layer 1 network element in an optical transport network at the first location;
   integrating, by the processing system, the first alarm data and the second alarm data to identify one or more troubleshooting actions, wherein the first alarm data includes a fault and the second alarm data includes a hard alarm;
   determining, by the processing system, a direction of the hard alarm, wherein the one or more troubleshooting actions are based on the direction of the hard alarm; and
   performing, by the processing system, the one or more troubleshooting actions based on the first alarm data and the second alarm data.
2. The method of claim 1, further comprising:
   analyzing, by the processing system based on the first alarm data including a signal failure, a laser optical parameter at the Layer 1 network element; and
   determining, by the processing system, the laser optical parameter fails to satisfy a performance criteria, wherein the one or more troubleshooting actions include issuing a dispatch to replace a laser transmitter associated with the laser optical parameter.
3. The method of claim 1, further comprising:
   analyzing, by the processing system based on the first alarm data including a signal failure, a laser optical parameter at the Layer 1 network element;
   determining, by the processing system, the laser optical parameter satisfies a performance criteria;
   analyzing, by the processing system based on determining the laser optical parameter satisfies the performance criteria, the Layer 1 network element;
   determining, by the processing system, the second alarm data does not include a Layer 1 network alarm;
   analyzing, by the processing system based on determining the second alarm data does not include the Layer 1 network alarm, the first alarm data; and
   determining the first alarm data does not include a Layer 2 network alarm or a Layer 3 network alarm, wherein the one or more troubleshooting actions include issuing a dispatch to clean an optical line associated with the signal failure.
4. The method of claim 1 wherein the first alarm data includes a local fault.

5. The method of claim 1, wherein the direction of the hard alarm is downstream and the one or more troubleshooting actions include issuing a dispatch to replace a severed fiber optic.

6. The method of claim 1 wherein the first alarm data includes a remote fault.

7. The method of claim 1, further comprising:
acquiring, by the processing system, third alarm data from a second Layer 2 network element or a second Layer 3 network element at a second location, wherein the one or more troubleshooting actions are based on the third alarm data.

8. A system comprising:
a processor; and
a memory including instructions that, when executed by the processor, cause the system to:
acquire first alarm data from a Layer 2 network element or a Layer 3 network element at a first location;
acquire second alarm data from a Layer 1 network element in an optical transport network at the first location;
integrate the first alarm data and the second alarm data to identify one or more troubleshooting actions, wherein the first alarm data includes a fault and the second alarm data includes a hard alarm;
determining a direction of the hard alarm, wherein the one or more troubleshooting actions are based on the direction of the hard alarm; and
perform the one or more troubleshooting actions based on the first alarm data and the second alarm data.

9. The system of claim 8, wherein the instructions are further configured to cause the system to:
analyze, based on the first alarm data including a signal failure, a laser optical parameter at the Layer 1 network element; and
determine the laser optical parameter fails to satisfy a performance criteria, wherein the one or more troubleshooting actions include issuing a dispatch to replace a laser transmitter associated with the laser optical parameter.

10. The system of claim 8, wherein the instructions are further configured to cause the system to:
analyze, based on the first alarm data including a signal failure, a laser optical parameter at the Layer 1 network element;
determine the laser optical parameter satisfies a performance criteria;
analyze, based on determining the laser optical parameter satisfies the performance criteria, the Layer 1 network element;
determine the second alarm data does not include a Layer 1 network alarm;
analyze, based on determining the second alarm data does not include the Layer 1 network alarm, the first alarm data; and
determine the first alarm data does not include a Layer 2 network alarm or a Layer 3 network alarm, wherein the one or more troubleshooting actions include issuing a dispatch to clean an optical line associated with the signal failure.

11. The system of claim 8 wherein the first alarm data includes a local fault.

12. The system of claim 8, wherein the direction of the hard alarm is downstream and the one or more troubleshooting actions include issuing a dispatch to replace a severed fiber optic.

13. The system of claim 8, wherein the first alarm data includes a remote fault.

14. The system of claim 8, wherein the instructions are further configured to cause the system to:
acquire third alarm data from a second Layer 2 network element or a second Layer 3 network element at a second location, wherein the one or more troubleshooting actions are based on the third alarm data.

15. A non-transitory machine-readable medium comprising instructions that, when executed by a processor, cause the processor to:
acquire first alarm data from a Layer 2 network element or a Layer 3 network element at a first location;
acquire second alarm data from a Layer 1 network element in an optical transport network at the first location;
integrate the first alarm data and the second alarm data to identify one or more troubleshooting actions, wherein the first alarm data includes a fault and the second alarm data includes a hard alarm;
determine a direction of the hard alarm, wherein the one or more troubleshooting actions are based on the direction of the hard alarm; and
perform the one or more troubleshooting actions based on the first alarm data and the second alarm data.

16. The non-transitory machine-readable medium of claim 15, wherein the instructions are further configured to cause the processor to:
analyze, based on the first alarm data including a signal failure, a laser optical parameter at the Layer 1 network element; and
determine the laser optical parameter fails to satisfy a performance criteria, wherein the one or more troubleshooting actions include issuing a dispatch to replace a laser transmitter associated with the laser optical parameter.

17. The non-transitory machine-readable medium of claim 15, wherein the instructions are further configured to cause the processor to:
analyze, based on the first alarm data including a signal failure, a laser optical parameter at the Layer 1 network element;
determine the laser optical parameter satisfies a performance criteria;
analyze, based on determining the laser optical parameter satisfies the performance criteria, the Layer 1 network element;
determine the second alarm data does not include a Layer 1 network alarm;
analyze, based on determining the second alarm data does not include the Layer 1 network alarm, the first alarm data; and
determine the first alarm data does not include a Layer 2 network alarm or a Layer 3 network alarm, wherein the one or more troubleshooting actions include issuing a dispatch to clean an optical line associated with the signal failure.

18. The non-transitory machine-readable medium of claim 15, wherein the first alarm data includes a local fault.

19. The non-transitory machine-readable medium of claim 15, wherein the direction of the hard alarm is downstream and the one or more troubleshooting actions include issuing a dispatch to replace a severed fiber optic.

20. The non-transitory machine-readable medium of claim 15, wherein the first alarm data includes a remote fault.

* * * * *